(12) United States Patent
Fujimura et al.

(10) Patent No.: US 6,810,624 B2
(45) Date of Patent: Nov. 2, 2004

(54) STRUCTURE OF MOLDING PART OF A WEATHER STRIP FOR USE IN A SLIDE TYPE REAR DOOR

(75) Inventors: Yoshio Fujimura, Hiroshima (JP); Isao Nakagawa, Hiroshima (JP); Yukihisa Matsuda, Toyota (JP); Yoshio Itou, Yokosuka (JP)

(73) Assignee: Nishikawa Rubber Co., Ltd., Hiroshima-ken (JP)

( * ) Notice: Subject to any disclaimer, the term of this patent is extended or adjusted under 35 U.S.C. 154(b) by 21 days.

(21) Appl. No.: 10/302,810

(22) Filed: Nov. 22, 2002

(65) Prior Publication Data

US 2003/0121210 A1 Jul. 3, 2003

(30) Foreign Application Priority Data

Nov. 26, 2001 (JP) ......................................... 2001-359157

(51) Int. Cl.[7] ............................. E06B 7/16; B60J 10/08
(52) U.S. Cl. ................... 49/479.1; 49/484.1; 296/146.9
(58) Field of Search .............................. 49/479.1, 434.1, 49/475.1, 490.1, 498.1, 480.1; 296/146.9, 207, 198; 428/122, 99, 492

(56) References Cited

U.S. PATENT DOCUMENTS

| 4,277,099 A | * | 7/1981 | Klein et al. ............... 296/146.9 |
| 4,720,138 A | * | 1/1988 | Schlapp et al. ............ 49/490.1 |
| 4,892,348 A | * | 1/1990 | Nozaki ..................... 296/146.9 |
| 5,527,583 A | * | 6/1996 | Nozaki et al. ........... 296/146.9 |
| 6,138,415 A | * | 10/2000 | Ohtsu et al. ............... 49/490.1 |
| 6,243,990 B1 | * | 6/2001 | Cornils et al. ............. 49/490.1 |

FOREIGN PATENT DOCUMENTS

EP          A 390238      * 10/1990      ............ 49/490.1 X

* cited by examiner

Primary Examiner—Hugh B. Thompson, II
(74) Attorney, Agent, or Firm—Flynn, Thiel, Boutell & Tanis, P.C.

(57) ABSTRACT

A structure of a molding part of a weather strip for use in a rear door by firmly attaching the molding part in the rear door so as to reduce weight and manufacturing costs and ensures sufficient sealing property. The molding part is attached to a recess together with a slide arm 4. The recess is formed at the front lower end of the rear door. The molding part comprises merely a plate insert except sealing function parts. The sealing function parts elastically contact a car body side. The plate insert is fixed to the rear door by bolts and nuts.

9 Claims, 5 Drawing Sheets

STRUCTURE OF MOLDING PART OF A WEATHER STRIP FOR USE IN A SLIDE TYPE REAR DOOR

FIELD OF THE INVENTION

The invention relates to a structure of a molding part of a weather strip attached to a recess formed at a front lower end of a slide door, in which a slide arm is also provided. The weather strip is attached to a manually operated or electrically operated slide rear door (hereinafter simply referred to as rear door) of a car having no center pillar, ensuring sealing property between the rear door and a front door.

BACKGROUND OF THE INVENTION

A conventional structure of a molding part is described with reference to FIGS. 1 to 4.

In a car having a rear door 2 but having no center pillar between the rear door 2 and a front door 1, a weather strip 20 is attached to the front part of the rear door 2 and elastically contacts the front door 1 for ensuring sealing property between the rear door 2 and the front door 1.

With the car having such a configuration, a recess 6 is formed at the front lower end of the rear door 2, and a slide arm 4 for sliding the rear door 2 is attached to the recess 6. The recess 6 is sealed by a molding part 21 forming the lower end of the weather strip 20.

Front door window glass 7 and rear door window glass 8 are supported by the respective door body. The rear door 2 separates the vehicle inside 30 from the vehicle outside 40 as shown in prior art FIG. 3. FIG. 3 also illustrates seal 16.

Since this type of car does not comprise a center pillar, a molding part 21 of the weather strip 20 attached to the rear door is designed to elastically contact a molding part of the front door 1 and also an opening weather strip 5 attached to a side edge 3c of a floor 3b of a body 3. Accordingly, the weather strip 20 is inevitably made large, causing a problem of increasing weight and manufacturing costs thereof.

Further, since the molding part 21 of the weather strip 20 is fixed to the rear door 2 by clips 22, it can not be firmly built, nevertheless building operation is relatively troublesome, thereby causing a problem that sealing property of some areas between the clips on the molding part 21 can not be ensured sufficiently

SUMMARY OF THE INVENTION

The invention has been developed to solve the foregoing problems and it is an object of the invention to provide a molding part of a weather strip for use in a rear door which is firmly built in the rear door so as to for ensuring sufficient sealing property and to reduce weight and manufacturing costs thereof The molding part 11 of a weather strip 10 for use in a rear door 2 is attached in a recess 6 together with a slide arm 4. The recess 6 is formed at the front lower end of the rear door 2. The molding part 11 is composed merely of a plate insert 13 except the sealing function parts 12 which elastically contacts the side edge 3c of a floor 3b of the car body 3. The plate insert 13 is fixed to the rear door 2 by bolts 14 and nuts 15.

PREFERRED EMBODIMENT OF THE INVENTION

Figure 1:
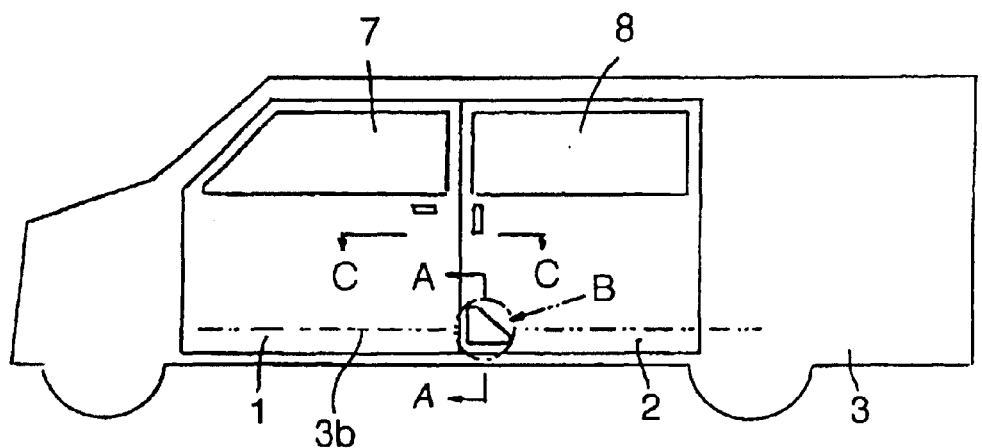
FIG. 1 is a side view of a car provided with a molding part of a weather strip for use in a rear door.
Figure 2:
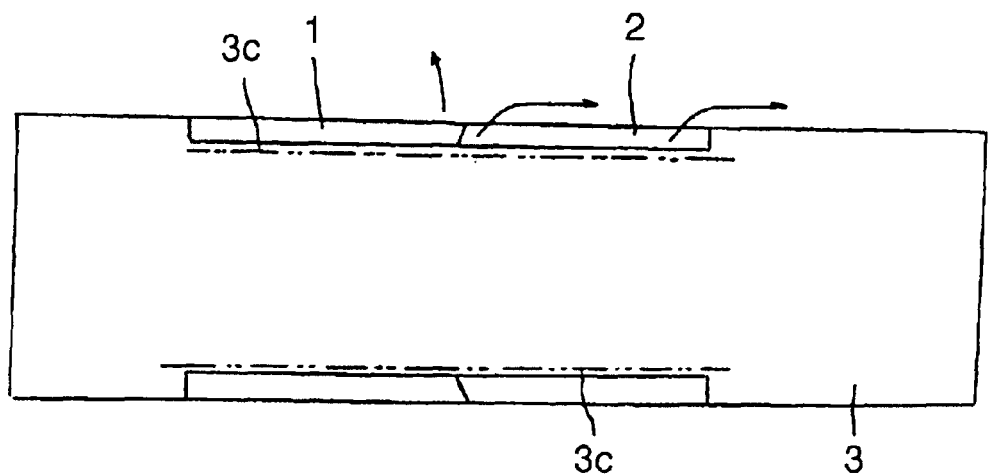
FIG. 2 is a plan view of FIG. 1.
Figure 3:
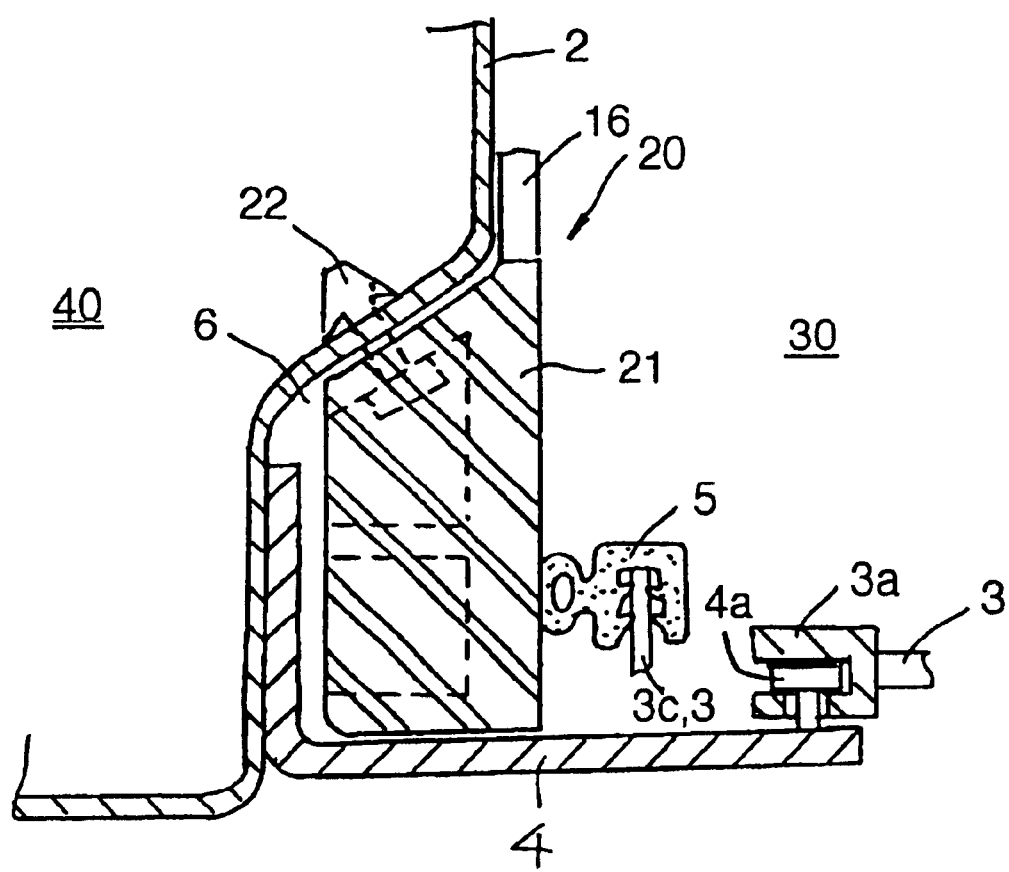
FIG. 3 is a sectional view of a conventional weather strip taken along A—A in FIG. 1.
Figure 4:
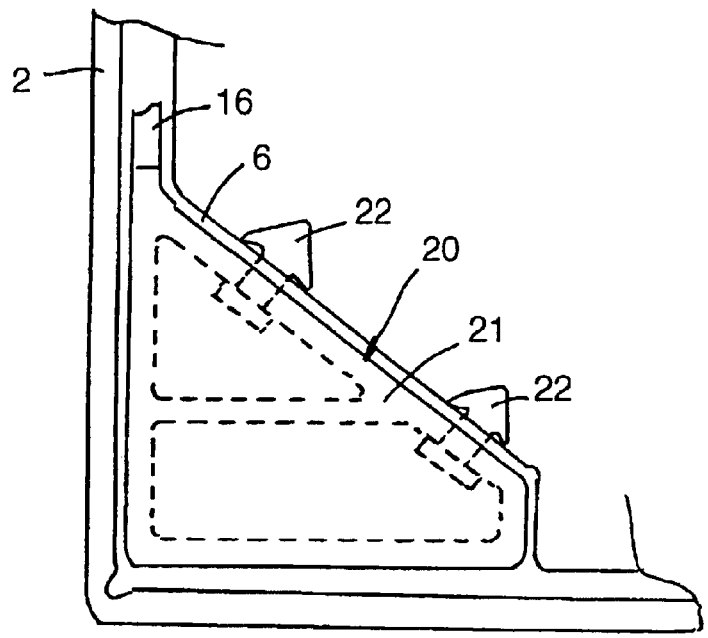
FIG. 4 is an enlarged view of a part of the conventional weather strip indicated by B in FIG. 1.

An embodiment of a molding part 11 of a weather strip for use in a rear door according to the invention is now described with reference to FIGS. 1, 2 and 5 to 7.

The molding part 11 is attached to a recess 6 together with a slide arm 4. The recess 6 is formed on the front lower end of an electrically operated rear door 2. The molding part 11 is formed merely of a plate insert 13 except seal function parts 12 which elastically contact the rear door 2 at one end and contact a side edge 3c of a floor 3b of the body 3 at the other end.

The side edge 3c of the floor 3b of the body 3 includes a member attached to the side edge 3c, and hence the side edge 3c includes an opening weather strip 5 according to the embodiment.

With the molding part 11 of the embodiment, the plate insert 13 is fixed to the rear door 2 by two sets of bolts 14 and nuts 15. Although the number of the bolts 14 and the nuts 15 are two sets according to the embodiment, it is set to an suitable number depending on the size of the molding part 11.

Figure 5:
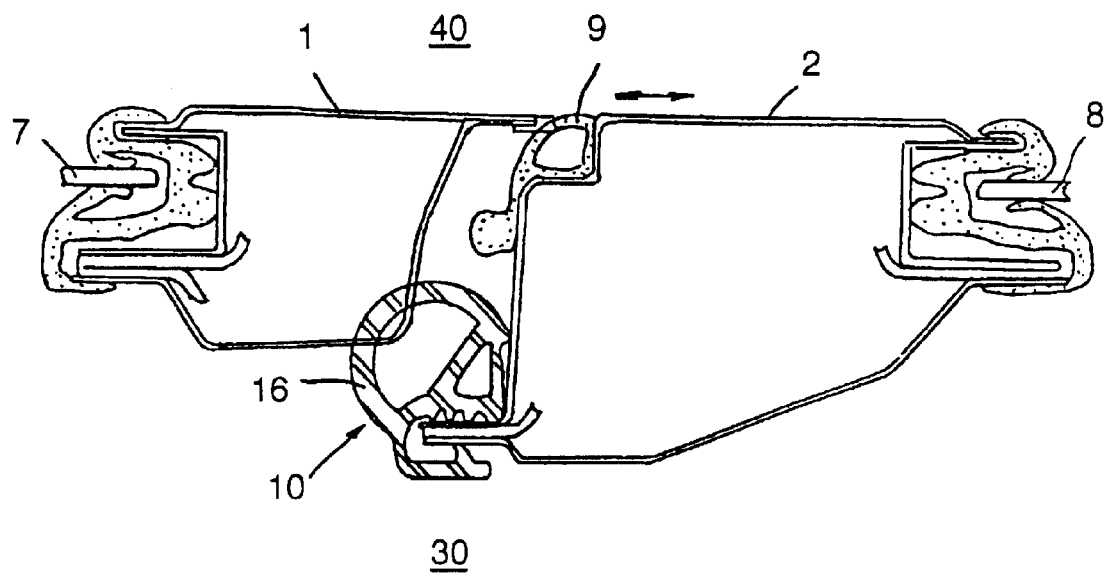
FIG. 5 is a sectional view of an upper part of a molding part of a weather strip for use in a rear door according to the invention taken along line C—C in FIG. 1.
Figure 6:
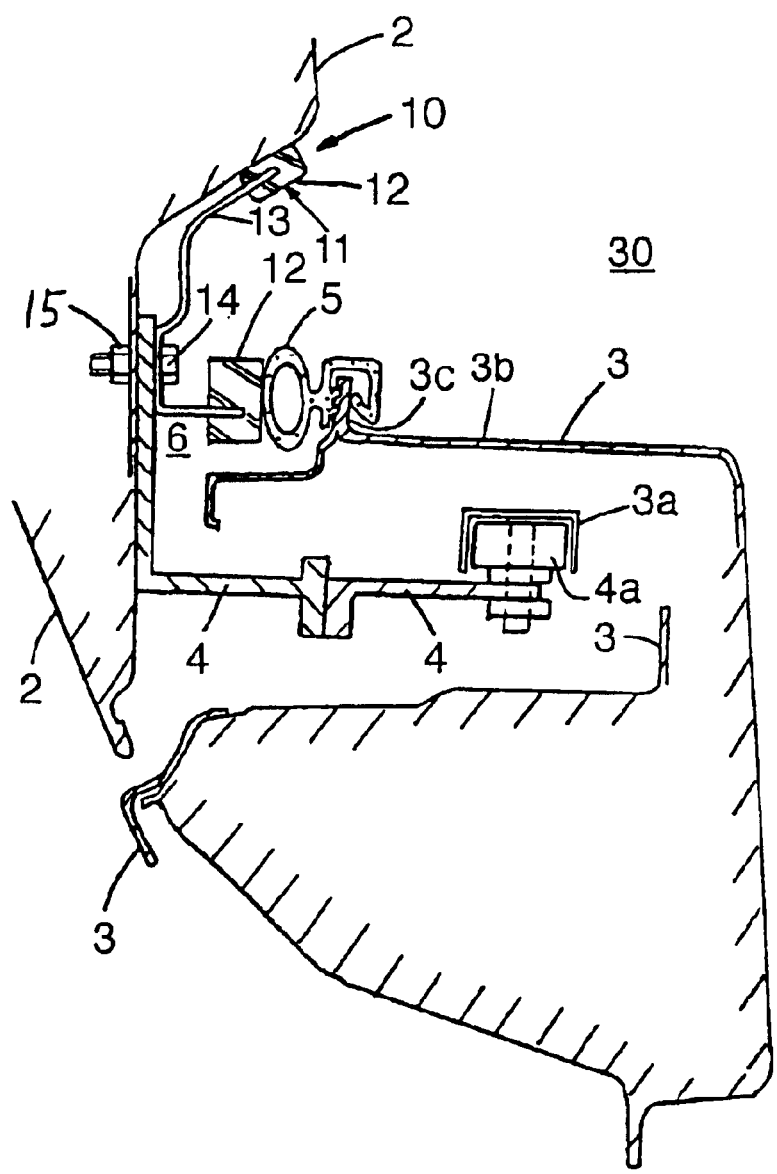
FIG. 6 is a sectional view of the weather strip according to the invention taken along line A—A in FIG. 1.
Figure 7:
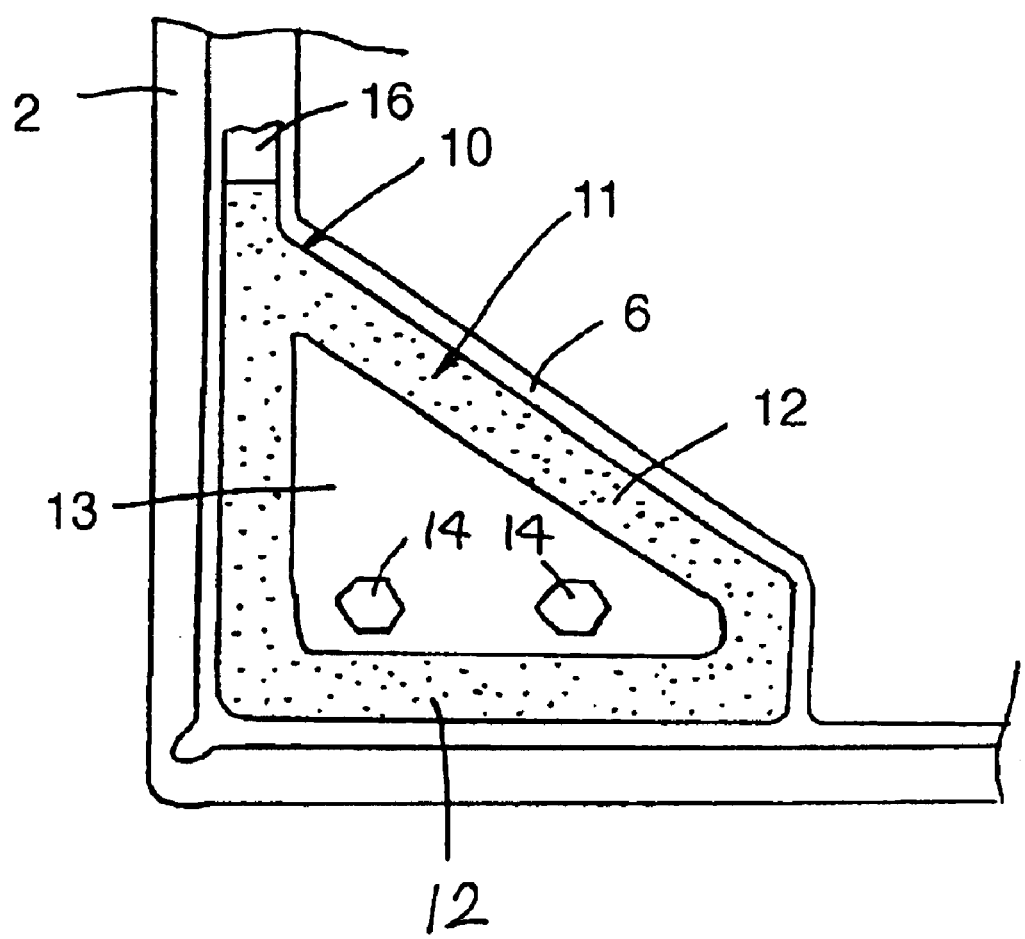
FIG. 7 is an enlarged view of a part of the weather strip according to the invention indicated by B in FIG. 1.

With the molding part 11 according to the embodiment, the upper end thereof is integrally formed with an extrusion forming part 16, and the extrusion forming part 16 seals between the front door 1 and the rear door 2 at the inside of the car. One weather strip 10 is configured by the molding part 11 and the extrusion forming part 16. Further, as shown in FIG. 5, a parting seal 9 is attached to the outside of the rear door 2 to which the molding part 11 is attached to, so that sealing property is ensured at the inner side and the outer side of the car. Depicted by 7 is a front door glass and 8 is a rear door glass.

A roller 4a is rotatably attached to the interior side end of the slide arm 4 fixed to the rear door 2 together with the molding part 11. The rear door 2 can be freely slid by allowing the roller 4a to travel along the guide rail 3a attached to the body 3.

Since the molding part 11 is formed merely of a plate insert 13 except seal function parts 12, the molding part 11 of the invention is drastically reduced in its weight and manufacturing costs can be reduced compared with a conventional molding part where the entire portion is formed of synthetic rubber.

Since the molding part 11 is fastened to the rear door 2 with the bolts 14 and nuts 15, it can be firmly fixed to the rear door 2 compared with a conventional molding part in which a synthetic rubber part is fastened to the rear door 2 by clips. That is, with the fixation of the plate insert 13 to the rear door 2, the former is firmly fixed to the latter by strongly fastening the bolts 14 and nuts 15, and the plate insert 13 has high rigidity, so that the molding part 11 is not deformed like synthetic rubber of the conventional molding part caused by a strong fastening operation. As a result, unlike the prior art, no defects in sealing property is produced at the portions between the clips, thereby a sufficient sealing property is ensured at the entire seal function parts 12.

Further, since the molding part 11 is fixed to the rear door 2 by the bolts 14 and nuts 15 together with the slide arm 4, extra parts for fastening the slide arm 4 are unneeded.

The molding part 11 of the weather strip for use in a rear door according to the invention is formed merely of the plate insert 13, except for the seal function parts or seal parts 12 that elastically contact the rear door 2 at one end and contact a side edge 3*c* of a floor 3*b* of the body 3 at the other end. Therefore, a weight reduction of the molding part 11 can be achieved and manufacturing costs can be reduced.

With the molding part 11 having such a configuration, the plate insert 13 is fixed to the rear door 2 by the bolts 14 and nuts 15 so that it can be firmly fixed to the rear door 2, thereby ensuring sufficient sealing property at the entire seal function parts 12.

Further, since the slide arm 4 is fixed to the rear door 2 by the bolts 14 and nuts 15 which are used for fixing the molding part 11 to the rear door 2, extra members for fixing the slide arm 4 to the rear door 2 are unneeded. As a result, an operation for attaching the molding part 11 to the rear door 2 is made easy, and manufacturing costs can be further reduced.

The disclosure of Japanese Patent Application No. 2001-359157 filed Nov. 26, 2001 including specification, claims, and drawings, is incorporated herein by reference.

What is claimed is:

1. A combination for a vehicle having no central pillar between a front door and a rear door, and having a slide arm below a rear door, comprising:
   a rear door having a recess formed at a lower front end thereof;
   a weather strip comprising a plate insert and sealing parts supported thereon, said plate insert and said sealing parts being positioned in the recess at the front lower end of said rear door; and
   a securing apparatus for fixedly securing said plate insert to said rear door.

2. The combination of claim 1, wherein said plate insert comprises a metal plate insert and said sealing parts of said weather strip comprise molded parts.

3. The combination of claim 1, wherein said plate insert comprises a metal plate insert and said securing apparatus comprises a metal fastener.

4. The combination of claim 3, wherein said metal fastener comprises a pair of nuts and bolts.

5. The combination of claim 1, wherein said weather strip is capable of providing elastic contact with a molding part of a front door and capable of providing elastic contact with an opening weather strip attached to a side edge of a floor of a vehicle.

6. A combination for a vehicle having no central pillar between a front door and an adjacent rear door, comprising:
   a front door;
   a rear door having a recess formed at a lower front end thereof;
   a floor adjacent the front and rear doors, the floor including a floor weather strip oriented outwardly;
   a rear door weather strip comprising a plate insert and at least first and second sealing parts supported thereon, said plate insert and said sealing parts being positioned in the recess at the front lower end of said rear door; and
   a securing apparatus for securing said plate insert to said rear door,
   wherein when the front and rear doors are closed, said first sealing part contacts said floor weather strip and said second sealing part contacts said front door.

7. The combination of claim 6, wherein said plate insert comprises a metal plate insert and said securing apparatus comprises a metal fastener.

8. The combination of claim 7, wherein said metal fastener comprises a pair of nuts and bolts.

9. The combination of claim 6, wherein said securing apparatus that secures said plate insert to said rear door secures a slide arm to said rear door, said slide arm extending under the floor.

* * * * *